US008976451B2

(12) United States Patent
Shen et al.

(10) Patent No.: US 8,976,451 B2
(45) Date of Patent: Mar. 10, 2015

(54) LENS ARRAY MODULE

(71) Applicant: Forward Optics Co., Ltd., Taichung (TW)

(72) Inventors: Wei Shen, Taichung (TW); Yuan-Lin Lee, Taichung (TW)

(73) Assignee: Forward Optics Co., Ltd, Taichung (TW)

( * ) Notice: Subject to any disclaimer, the term of this patent is extended or adjusted under 35 U.S.C. 154(b) by 103 days.

(21) Appl. No.: 13/958,133

(22) Filed: Aug. 2, 2013

(65) Prior Publication Data

US 2015/0036219 A1 Feb. 5, 2015

(51) Int. Cl.
*G02B 27/10* (2006.01)
*G02B 3/00* (2006.01)

(52) U.S. Cl.
CPC .................................... *G02B 3/0037* (2013.01)
USPC .......................................................... 359/619

(58) Field of Classification Search
USPC .......................................................... 359/619
See application file for complete search history.

(56) References Cited

U.S. PATENT DOCUMENTS 7,411,733 B2 * 8/2008 Toyoda et al. ................ 359/619
2011/0122308 A1 5/2011 Duparre

* cited by examiner

*Primary Examiner* — James Jones
(74) *Attorney, Agent, or Firm* — Shook Hardy & Bacon LLP

(57) ABSTRACT

A lens array module includes an arrayed optical element including a light blocking frame and a lens unit, and a light sensor array unit. The light blocking frame includes a bottom plate with multiple through holes, a surrounding wall, and a partition wall integrally connected to and cooperating with the bottom plate and surrounding walls to define multiple optical channels. The lens unit includes a substrate abutting against the bottom plate and including multiple lens elements that are aligned respectively with the through holes, and a plurality of upper positioning walls integrally connected to the substrate. The light sensor array unit includes multiple light sensing components respectively aligned with the lens elements.

10 Claims, 3 Drawing Sheets

20III 30 40 20II 30 40 20I 30 40 50 51 51 10

LENS ARRAY MODULE

BACKGROUND OF THE INVENTION

1. Field of the Invention

The invention relates to a lens, more particularly to a lens array module that can precisely position an optical interface.

2. Description of the Related Art

A conventional imaging apparatus (e.g., as disclosed in US20110122308 A1) includes a plurality of lens wafers each of which has a plurality of optical elements that are arranged into an array, a plurality of spacers set around outer peripheries of the lens wafers to separate the lens wafers from one another, a light sensor array, and a plurality of blocking members to separate the optical elements of each lens wafer so as to form a plurality of optical channels. This conventional imaging apparatus can block stray light from penetrating different optical channels, thus preventing the presence of noise during image-capture and image reconstruction errors during image-processing. However, since the spacers and the lens wafers are independent, separate components, offsets is inevitable during assembly, thus affecting the positioning of the lens wafers along an optical axis. Furthermore, due to the abutment of the spacers and the blocking members against the lens wafers, the positioning of the lens wafers along the optical axis is directly affected by the spacers and the blocking members, where offsets in height among the spacers and the blocking members adversely affect the positioning of the lens wafers along the optical axis.

SUMMARY OF THE INVENTION

Therefore, the object of the present invention is to provide a lens array module that can eliminate the aforesaid drawbacks of the prior art.

According to the present invention, there is provided a lens array module including a housing, at least one arrayed optical element and a light sensor array.

The arrayed optical element is disposed in the housing, and includes a light blocking frame and a lens unit.

The light blocking frame includes a bottom plate that is formed with a plurality of through holes arranged into an array, a surrounding wall that is integrally connected to the bottom plate and that extends in an upward direction along an optical axis, and at least one partition wall that is integrally connected to the bottom plate and the surrounding wall and that extends in the upward direction. The surrounding wall and the partition wall cooperate with each other to define a plurality of spaced apart optical channels, each of the optical channels being in spatial communication with a respective one of the through holes. The lens unit includes a substrate and a plurality of upper positioning walls. The substrate has a top side abutting against a bottom side of the bottom plate and includes a plurality of lens elements, each of which is aligned with a respective one of the through holes. The upper positioning walls are integrally connected to the top side of the substrate and extend in the upward direction, and each of the upper positioning walls has an inner side that abuts against an outer side of the surrounding wall. A top side of each of the upper positioning walls is not lower than the top side of the surrounding wall in the upward direction.

The light sensor array unit is disposed in the housing adjacent to a bottom side of the substrate that is opposite to the top side of the substrate, and includes a plurality of light sensing components, each of which is aligned with a respective one of the lens elements of the lens unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
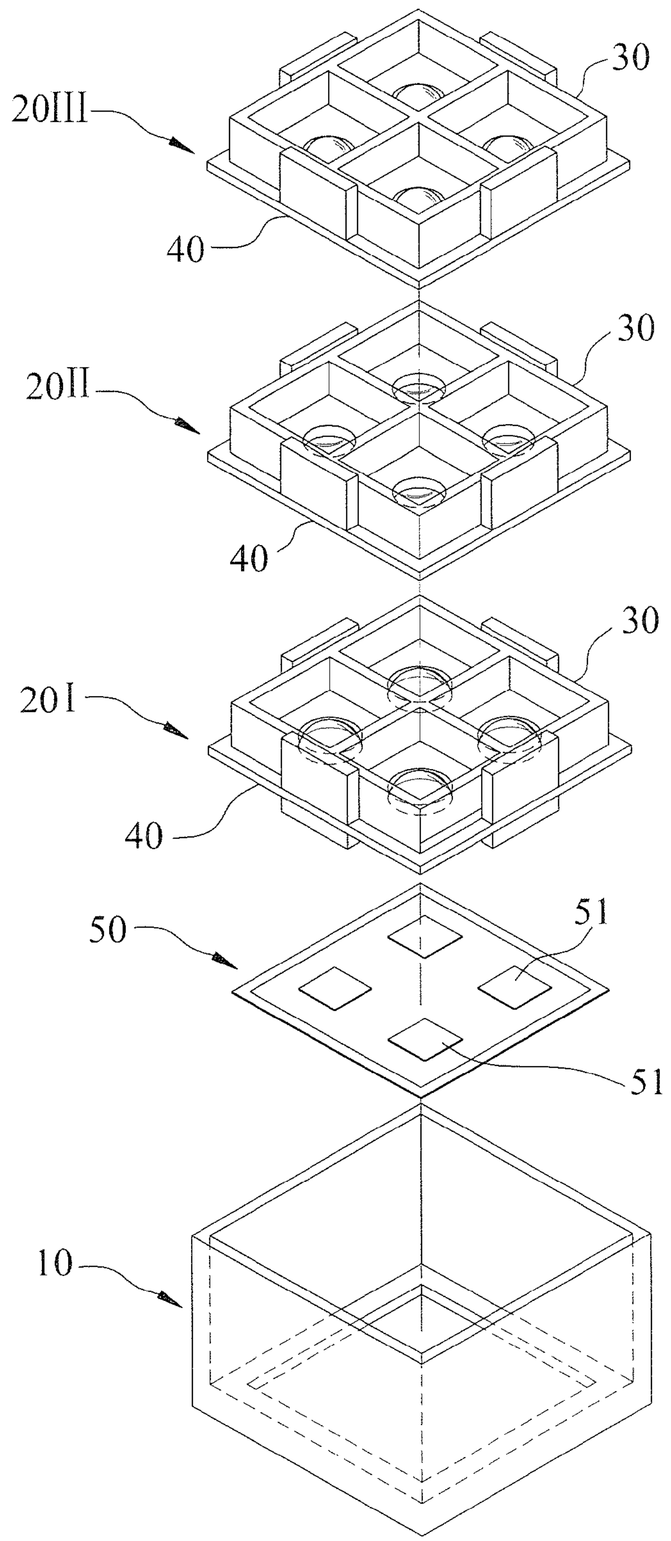
FIG. 1 is an exploded perspective view of the preferred embodiment of a lens array module according to the present invention.
Figure 2:
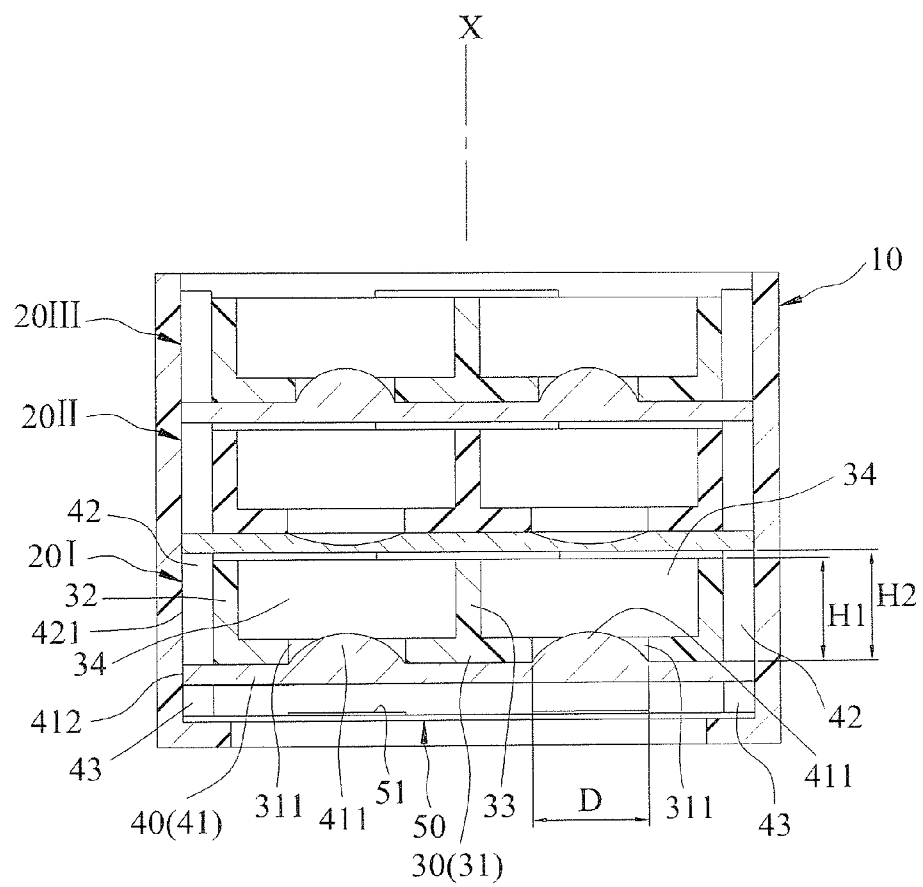
FIG. 2 is a schematic sectional view of the preferred embodiment.
Figure 3:
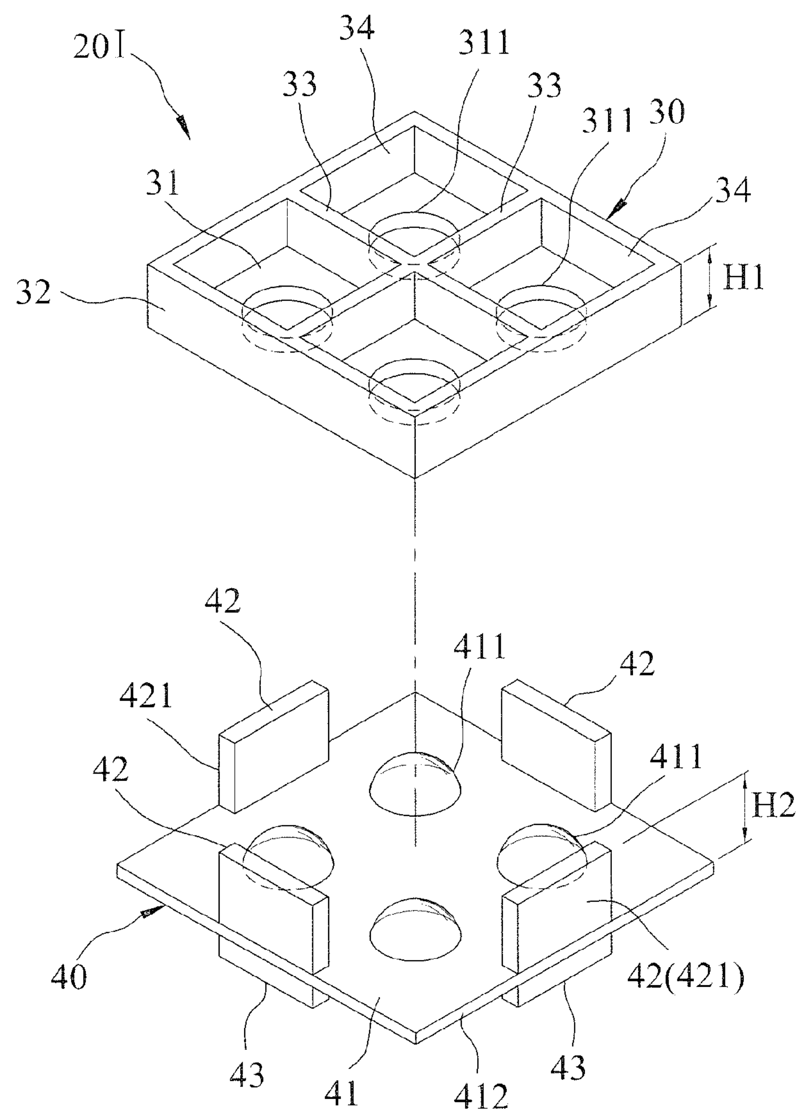
FIG. 3 is a fragmentary exploded perspective view of the preferred embodiment for illustrating an arrayed optical element and a lens unit.

Referring to FIGS. 1 to 3, the preferred embodiment of a lens array module according to the present invention includes a housing 10, three arrayed optical elements 20I, 20II, 20III, and a light sensor array unit 50.

The arrayed optical elements 20I, 20II, 20III are disposed sequentially in the housing 10 and each of which includes a light blocking frame 30 and a lens unit 40. In this embodiment, each of the arrayed optical elements 20I, 20II, 20III has a length and a width both not greater than 3 mm, and a height not greater than 2 mm.

The light blocking frame 30 has a bottom plate 31 that is formed with a plurality of through holes 311 arranged into an array, a surrounding wall 32 that is integrally connected to the bottom plate 31 and that extends in an upward direction along an optical axis (X), and two partition walls 33 that are integrally connected to the bottom plate 31 and the surrounding wall 32 and that extend in the upward direction. The surrounding wall 32 cooperates with the partition walls 33 to define a plurality of spaced apart optical channels 34, each of the optical channels 34 being in spatial communication with a respective one of the through holes 311. The light blocking frame 30 is made of one of a material with low light transmittance and a non-light transmissive material. It can be understood that when there is only one partition wall 33, multiple (i.e., two) optical channels 34 can still be defined with the surrounding wall 32. In this embodiment, the light blocking frame 30 has a first height (H1) extending along the optical axis (X), and is made of liquid crystal polymer (LCP) such as Zenite® 5130L BK010 supplied by DuPont. In addition, dimensions of the through holes 311 of the light blocking frame 30 match the configuration of the lens unit 40, and may vary from one another.

The lens unit 40 includes a substrate 41 that has a top side abutting against a bottom side of the bottom plate 31 of the light blocking frame 30, and a plurality of upper positioning walls 42 that are integrally connected to the top side of the substrate 41 and that extend in the upward direction. It should be noted that the lens unit 40 of the arrayed optical element 20I further includes a plurality of lower positioning walls 43 that are integrally connected to a bottom side of the substrate 41 opposite to the top side of substrate 41 and that extend in a downward direction along the optical axis (X) that is opposite to the upward direction. In this embodiment, the lens unit 40 is formed into one piece and made of an optical plastic material, such as PMMA (polymethylmethacrylate) supplied by Mitsubishi, PC-AD5503 (polycarbonate) supplied by Teijin, ZEONEX 480R supplied by ZEONEX, or ULTEM-1010 supplied by SABIC, among others.

The substrate 41 includes a plurality of lens elements 411 and an outer peripheral edge 412; each lens element 411 is aligned with a respective one of the through holes 311 of the bottom plate 31 and has a clear aperture (D). The shapes and dimensions of the lens elements 411 of the arrayed optical elements 20I, 20II, 20III may be adjusted differently based on different optical performance requirements. For example, in this embodiment, the lens elements 411 of the arrayed optical elements 20I, 20III are convex lens elements whereas the lens elements 411 of the arrayed optical element 20II are concave lens elements.

Each of the upper positioning walls 42 of the lens unit 40 has an inner side that abuts against an outer side of the surrounding wall 32, a top side that is not lower than the top side of the surrounding wall 32 in the upward direction, and an outer side 421 that is flat, that is distal from the surrounding wall 32 and opposite to the inner side, and that abuts against an inner side of the housing 10. The outer peripheral edge 412 of the substrate 41 is disposed within a boundary defined cooperatively by the outer sides 421 of the upper positioning walls 42.

In this embodiment, each of the upper positioning walls 42 has a second height (H2) extending along the optical axis (X) and greater than the first height (H1), wherein a difference between the first and second heights (H1, H2) is not greater than 50 μm, and a ratio between the first height (H1) and the clear aperture (D) of each of the lens elements 411 is within the range of between 0.2 and 2.0, i.e., $0.2 \leq H1/D \leq 2.0$. It is understood that if this ratio is below 0.2, there would be inadequate light shielding, and if this ratio is greater than 2.0, the overall height of the arrayed lens module would be increased.

The light sensor array unit 50 is disposed in the housing 10 adjacent to the bottom side of the substrate 41, abuts against the lower positioning walls 43 of the lens unit 40 of the arrayed optical element 20I, and includes a plurality of light sensing components 51. Each of the light sensing components 51 is aligned with a respective one of the lens elements 411 of the lens unit 40 of each of the arrayed optical elements 20I, 20II, 20III.

During assembly, after placing the light sensor array unit 50 in the housing 10, the arrayed optical element 20I is disposed in the housing 10 such that the lower positioning walls 43 thereof abut against the light sensor array 50 so as to set a distance between the lens elements 411 of the arrayed optical element 20I and the light sensor array 50 along the optical axis (X). After placing the other two arrayed optical elements 20II, 20III into the housing 10, the upper positioning walls 42 of each of the arrayed optical elements 20I, 20II abut against the substrate 41 of an upper adjacent one of the arrayed optical elements 20II, 20III to set a distance between the lens elements 411 of adjacent pairs of the arrayed optical elements 20I, 20II, 20III along the optical axis (X). Simultaneously, the outer sides 421 of the upper positioning walls 42 of the arrayed optical elements 20I, 20II, 20III abut against the inner side of the housing 10 to efficiently position the lens elements 411 of the arrayed optical elements 20I, 20II, 20III along a horizontal direction perpendicular to the upward direction. As a result, the position of the lens elements 411 of the arrayed optical elements 20I, 20II, 20III is accurately controlled through this construction to satisfy the optical performance requirements.

Through the aforementioned description, the advantages of this invention can be summarized as follows:

a) Since the second height (H2) of the upper positioning walls 42 of the lens unit 40 is greater than the first height (H1) of the light blocking frame 30, only the upper positioning walls 42 need to be controlled in terms of height tolerance along the optical axis (X) to effectively maintain the positioning of the lens units 40 along the optical axis (X), making manufacturing and assembly processes more convenient than those of the prior art.

b) Since the lens unit 40 is formed integrally as one piece, assembly tolerance between the upper (lower) positioning walls 42 (43) and the lens elements 411 is completely eliminated. Moreover, with the upper positioning walls 42 being integrally formed on the corresponding substrate 41, the resultant lens unit 40 is prevented from being affected by dimensional tolerances of other components, such as the light blocking frame 30. Therefore, the novel use of the upper positioning walls 42 to accurately control and maintain the positioning of the lens elements 411 improves the optical properties of the lens array module.

c) The ratio of the first height (H1) of the light blocking frame 30 and the clear aperture (D) of the lens elements 411 ranges between 0.2 and 2.0, preventing the light blocking frame 30 from being too low, thus causing inadequate shielding effects, or from being too high, thus increasing the overall height of the lens array module.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A lens array module comprising:

a housing;

at least one arrayed optical element disposed in said housing, and including a light blocking frame and a lens unit, said light blocking frame including a bottom plate that is formed with a plurality of through holes arranged into an array, a surrounding wall that is integrally connected to said bottom plate and that extends in an upward direction along an optical axis, and at least one partition wall that is integrally connected to said bottom plate and said surrounding wall and that extends in the upward direction, said surrounding wall and said at least one partition wall cooperating to define a plurality of spaced apart optical channels, each of said optical channels being in spatial communication with a respective one of said through holes, said lens unit including a substrate that has a top side abutting against a bottom side of said bottom plate and that includes a plurality of lens elements, each of which is aligned with a respective one of said through holes, and a plurality of upper positioning walls that are integrally connected to the top side of said substrate and that extend in the upward direction, each of said upper positioning walls having an inner side that abuts against an outer side of said surrounding wall, a topside of each of said upper positioning walls being not lower than the top side of said surrounding wall in the upward direction; and a light sensor array unit disposed in said housing adjacent to a bottom side of said substrate that is opposite to the top side of said substrate, and including a plurality of light sensing components, each of which is aligned with a respective one of said lens elements of said lens unit.

2. The lens array module as claimed in claim 1, wherein said light blocking frame has a first height extending along the optical axis, and each of said lens elements of said lens unit has a clear aperture, where 0.2≤the first height/the clear aperture≤2.0.

3. The lens array module as claimed in claim 2, wherein each of said upper positioning walls has a second height extending along the optical axis and greater than the first height, wherein a difference between the first and second heights is not greater than 50 μm.

4. The lens array module as claimed in claim 1, wherein each of said upper positioning walls has an outer side distal from said surrounding wall and opposite to said inner side, an outer peripheral edge of said substrate being disposed within a boundary defined cooperatively by said outer sides of said upper positioning walls.

5. The lens array module as claimed in claim 4, wherein said outer side of each of said upper positioning walls is flat.

6. The lens array module as claimed in claim 4, wherein said lens unit further includes a plurality of lower positioning walls integrally connected to the bottom side of said substrate, extending in a downward direction along the optical axis that is opposite to the upward direction, and abutting against said light sensor array unit.

7. The lens array module as claimed in claim 1, wherein each of a length and a width of said at least one arrayed optical element is not greater than 3 mm, and a height of said at least one arrayed optical element is not greater than 2 mm.

8. The lens array module as claimed in claim 1, wherein said light blocking frame is made of one of a material with low light transmittance and a non-light transmissive material.

9. The lens array module as claimed in claim 8, wherein said light blocking frame is made of a liquid crystal polymer.

10. The lens array module as claimed in claim 1, wherein said lens unit is made of an optical plastic material.

* * * * *